Feb. 14, 1961 J. I. CANTRAL 2,971,592
FLEXIBLE DISK GANG BEDDER
Filed Sept. 30, 1957

INVENTOR.
JOHN I. CANTRAL

United States Patent Office 2,971,592
Patented Feb. 14, 1961

2,971,592

FLEXIBLE DISK GANG BEDDER

John I. Cantral, Moline, Ill., assignor, by mesne assignments, to Deere & Company, a corporation of Delaware Filed Sept. 30, 1957, Ser. No. 687,093

1 Claim. (Cl. 172—572)

The present invention relates generally to agricultural implements and more particularly to ground working implements, particularly those commonly referred to as listers, bedders and the like.

The object and general nature of the present invention is the provision of the bedder of the tractor-carried type, in which there are similar ground working units, each flexibly connected with a supporting tool bar structure so as to have independent action. More specifically, it is a feature of this invention to provide a new and improved flexible disk gang frame for multi-row bedders or the like, especially constructed and arranged to permit the use of the disk gangs for cultivating beds in which each disk gang frame is capable of independent action but normally is held by resilient means in a given or predetermined position relative to the other associated disk gangs.

These and other objects and advantages of the present invention will be apparent to those skilled in the art after a consideration of the following detailed description, taken in conjunction with the accompanying drawings, in which.

Figure 1:
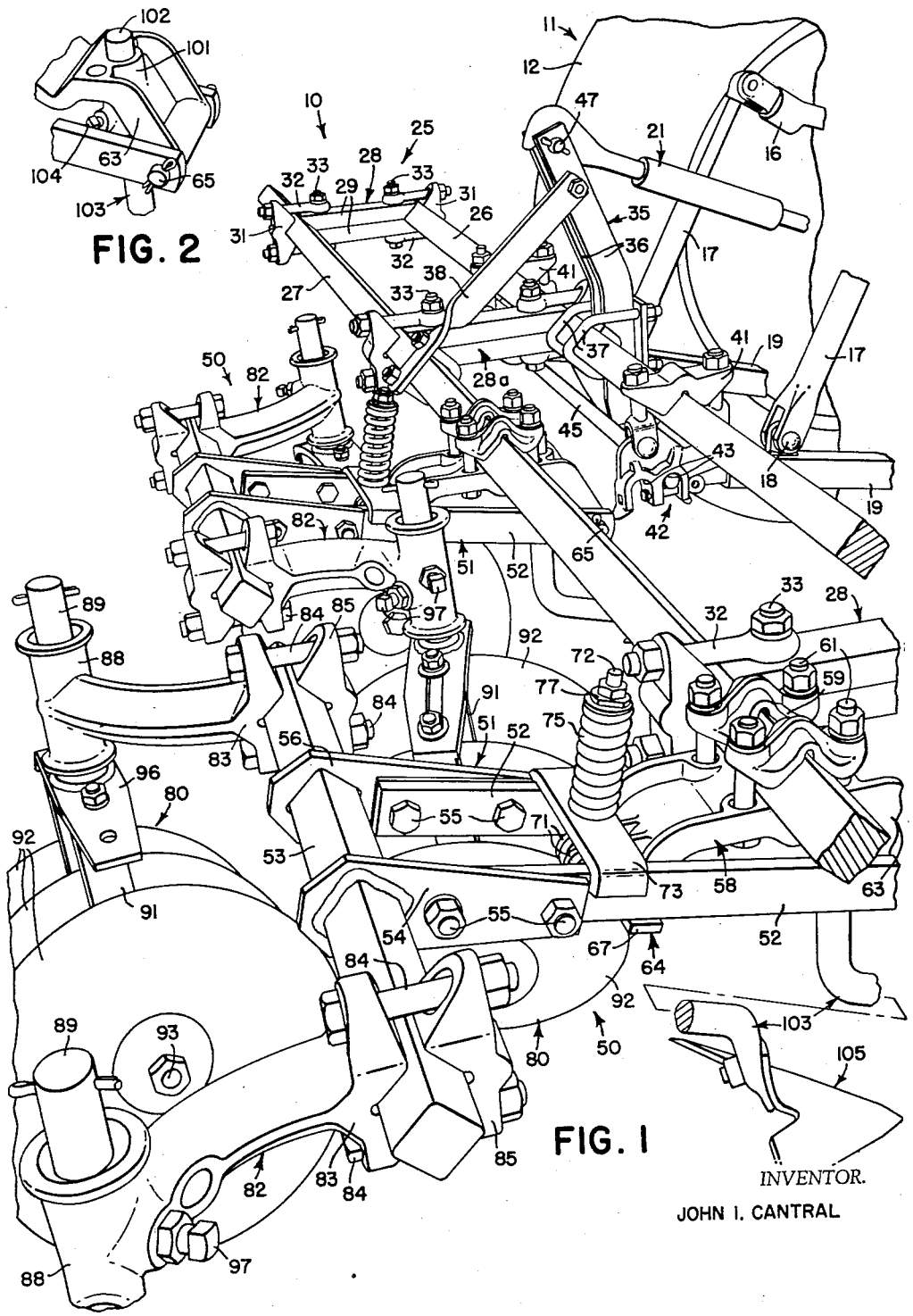
Fig. 1 is a perspective view of a tractor mounted flexible gang bedder in which the principles of this invention have been incorporated.
Figure 2:
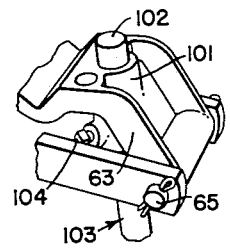
Fig. 2 is a fragmentary perspective view of the front portion of the gang frame mounting.

Referring now to the drawings, the bedder in which the principles of the present invention have been incorporated is indicated in its entirety by the reference numeral 10 and is shown as hitched to a tractor 11 having the usual rear drive wheels 12 and power lift unit, the latter including a rockshaft disposed transversely at the rear of the tractor and having, at each end thereof, a generally rearwardly extending power actuated lift arm 16 to which a pair of lift links 17 are connected. The lower ends of the links 17 are connected at 18 to a pair of draft links 19 the forward ends of which are swingably connected with the lower rear portion of the tractor 11. An upper link 21 is also swingably connected with the rear of the tractor, above the draft links 19, and the rear end of the upper link and the rear ends of the lower or draft links are adapted to receive any one of a number of different implements. One of such implements is the bedder 10 mentioned above.

The bedder 10, in which the principles of the present invention have been incorporated, comprises a tool bar structure 25 that is made up of a pair of transversely extending tool bars 26 and 27 that are spaced apart in a fore-and-aft direction by suitable clamping means 28. Such means, for example, comprises a pair of members 29 having wedge-shaped ends receiving the associated tool bars 26 and 27, with clamping caps 31 engaging the opposite sides of the associated tool bars and fixed in place by clamping bolts 32, the latter preferably being in the form of eye bolts, the eyes of which are rigidly fixed to the clamping members 29 by vertical bolts 33. Intermediate clamping means having the same general construction are shown at 28a and serve to connect the generally central portions of the tool bars 26 and 27. The bedder 10 also includes a forward vertically extending mast structure 35, which includes a pair of laterally spaced apart generally vertical bars 36 secured by U-shaped clamping bolts 37 to the front tool bar 26. The bars 36 are re-enforced by brace 38. Clamps 41 serve to fix a pair of draft link brackets 42 to the tool bar 26, each draft link bracket including a pair of notched sections 43, in either of which a draft link bar 45 is adapted to be disposed, the bar 45 being carried by the rear ends of the lower draft links 19. The upper ends of the mast bars 36 carry a pivot pin 47 to which the rear end of the upper link 21 is adapted to be connected by any suitable means.

The bedder 10 is provided with four tool units, only two of which are shown in the drawings, the right hand units being indicated at 50 and one being shown only partially. Since the four tool units 50 are substantially identical, except for slight differences in tool mountings which will be described below, a specific description of one unit will suffice. Each tool unit 50 includes a disk gang frame 51 that is made up of a pair of fore-and-aft extending generally laterally spaced apart frame bars 52 connected at their rear ends to a tool bar section 53. The connecting means comprises a first bracket 54 fixed as by welding to the associated tool section 53 and apertured to receive a pair of attaching bolts 55 that extend through openings in the rear end of one of the frame bars 52. The other frame bar 52 is also apertured to receive similar bolts 55 and the latter bolts extend through a bracket 56 that is shiftably but non-rotatably mounted on the associated tool bar section 53, which preferably is square in cross section.

The disk gang frame 51 is pivotally connected for up and down swinging with respect to an associated mounting bracket 58 that is fixed to the rear frame bar 27 by clamp means 59, the latter receiving four bolts 61 that extend downwardly at opposite sides of the tool bar 27 and connect to the central portion of the mounting bracket 58. The latter member preferably is in the form of a casting having a forward depending or vertically extending section 63 and a rear depending or vertically extending section 64. The forward section 63 is apertured transversely to receive pivot means 65 that extends through the openings in the front ends of the associated frame bars 52, the latter being connected to the tool bar sections 53 in such laterally spaced apart relation as to engage opposite sides, and be guided thereby, of the rear depending bracket section 64. Downward swinging movement of the associated disk gang frame 51 is limited by a pair of stop lugs 67 fixed to or carried on the lower portion of the rear bracket section 64, being arranged to engage the lower edges of the associated frame bars 52. The rear portion 64 of the mounting bracket 58 is provided with another pair of lugs 71 that are apertured to receive the pivot by which the lower eye end of an eye bolt 72 is pivotally connected therewith. The bolt 72 extends upwardly from the bracket 58 through a transverse bar 73, the ends of which extend over and embrace the upper edges of the frame bars 52. A spring 75 is disposed about the upper end of the bolt 72 and bears at its lower end against the cross bar 73. The upper end of this spring is anchored to an adjusting member 77 carried by the upper end of the bolt 72. The function of the spring 75 is to yieldably hold the frame 51 in a given position relative to the tool bar structure 25, but the spring 75 may yield to permit the frame to swing upwardly relative to the tool bar structure, and also relative to the associated tool units.

A pair of disk gangs, each indicated at 80, is fixed to opposite end portions of each tool bar section 53 by means that includes a pair of disk brackets 82, each preferably being of identical construction. Each disk bracket 82 includes a notched attaching head 83 shaped to receive one side of the associated tool bar section 53 and apertured to receive a pair of clamping bolts 84. The bolts 84 receive a clamping cap 85, and when the bolts are tightened the disk bracket 82 is firmly and rigidly connected to the tool bar sections 53. The bracket 82 is in the nature of a curved member and the end opposite the notched portion 83 is provided with a vertical sleeve section 88 which receives the spindle 89 of the associated disk gang 80, the latter including a generally vertical yoke 91 carrying bearings in which the disks 92 and associated gang bolt 93 are mounted for rotation. The yoke 91 may be secured in different positions to the curved bar 96 that is fixed to the lower end of the disk spindle 89. Suitable means, such as a set screw 97, serves to fix the disk spindle 89 in position in the sleeve 88, and if desired, two of such set screws 97 may be provided for each sleeve 88.

As shown in the drawings, the disk gangs 80 of one unit may be fixed to the associated tool bar section 53 so as to extend generally rearwardly therefrom, as shown in the lower left hand portion of Fig. 1, and the disk gangs for the next adjacent unit may be arranged with their disk brackets extending forwardly and laterally outwardly. By thus staggering the disk gang mounting, relatively narrow row spacings may be readily accommodated while at the same time providing the necessary clearance between the disk gangs so as to prevent the accumulation of trash and the like. Also, since each pair of disk gangs may flex generally upwardly relative to the other gangs and to the tool bar structure, uneven ground conditions will not interfere with the proper action of the disk gangs.

The forward portion of each mounting bracket 58 is provided with a generally vertically extending sleeve-like portion 101 in which the shank 102 of a sweep standard 103 may be disposed. Set screw means 104 is employed for locking the standard 103 against displacement, and the forward portion of the standard 103 is shaped to receive a cultivator sweep 105 that in operation cultivates the top of the bed ahead of the associated pair of disk gangs.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

A tractor mounted flexible gang bedder, comprising a transverse tool bar structure supported on the tractor to be raised and lowered thereby, a plurality of mounting brackets fixed to said tool bar structure, each mounting bracket including a forward depending portion and a rear depending portion, the forward depending portion being disposed forward of the associated part of said tool bar structure, a plurality of gang frames, one for each of said brackets and each gang frame including a pair of laterally spaced apart generally fore-and-aft extending frame bars pivoted to the forward depending portion of the associated mounting bracket and extending rearwardly of the tool bar structure and lying substantially in contact with laterally opposite portions of the rear depending mounting bracket portion, a pair of laterally outwardly extending stop lugs carried by the lowermost part of each depending bracket portion and spaced to engage the lower edges of the associated laterally spaced apart frame bars so as to serve as stops therefor, a tool bar section fixed to the rear portion of each gang frame and spaced rearwardly of the tool bar structure, said tool bar sections being generally in transverse alignment, a plurality of pairs of disk brackets, one pair for each tool bar section, each of said disk brackets including a tool bar section receiving portion, a laterally offset disk receiving portion, and means fixing said disk brackets to the associated tool bar sections so that, on one gang frame the disk brackets extend rearwardly and laterally outwardly from the associated tool bar section, and on the adjacent gang frame, the disk brackets extend forwardly and laterally outwardly, each of said gang frames having a length so as to extend rearwardly of the transverse tool bar structure a distance sufficient to accommodate said forwardly extending disk brackets, and a gang of disks carried on the outer end portion of each disk bracket.

References Cited in the file of this patent

UNITED STATES PATENTS

| | | |
|---|---|---|
| 903,896 | Schutt | Nov. 17, 1908 |
| 1,509,749 | Billings | Sept. 23, 1924 |
| 1,538,757 | Swindall | May 19, 1925 |
| 2,539,632 | Miller | Jan. 30, 1951 |
| 2,644,387 | Kamplade | July 7, 1953 |
| 2,669,174 | Oehler | Feb. 16, 1954 |

FOREIGN PATENTS

| | | |
|---|---|---|
| 460,590 | Germany | Oct. 12, 1927 |